United States Patent
Goffin et al.

(10) Patent No.: US 8,532,995 B2
(45) Date of Patent: *Sep. 10, 2013

(54) SYSTEM AND METHOD FOR ISOLATING AND PROCESSING COMMON DIALOG CUES

(75) Inventors: Vincent J. Goffin, Summit, NJ (US); Sarangarajan Parthasarathy, New Providence, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/476,155

(22) Filed: May 21, 2012

(65) Prior Publication Data

US 2012/0232892 A1 Sep. 13, 2012

Related U.S. Application Data

(63) Continuation of application No. 11/246,604, filed on Oct. 7, 2005, now Pat. No. 8,185,400.

(51) Int. Cl.
| | | |
|---|---|---|
| G10L 13/08 | (2006.01) | |
| G10L 13/00 | (2006.01) | |
| G10L 21/00 | (2006.01) | |
| G10L 15/20 | (2006.01) | |
| G10L 15/26 | (2006.01) | |
| G10L 17/00 | (2006.01) | |
| G10L 15/28 | (2006.01) | |
| G10L 15/00 | (2006.01) | |

(52) U.S. Cl.
USPC ........ 704/260; 704/261; 704/270; 704/270.1; 704/275; 704/233; 704/235; 704/246; 704/255; 704/257

(58) Field of Classification Search
USPC .............. 704/260, 261, 270, 275, 233, 255, 704/257, 270.1, 235, 246
See application file for complete search history.

(56) References Cited

U.S. PATENT DOCUMENTS

| | | | |
|---|---|---|---|
| 5,737,724 A | 4/1998 | Atal et al. | |
| 5,765,130 A | 6/1998 | Nguyen | |
| 6,246,986 B1 | 6/2001 | Ammicht et al. | |
| 6,496,799 B1 * | 12/2002 | Pickering | 704/235 |
| 6,574,595 B1 * | 6/2003 | Mitchell et al. | 704/242 |
| 6,574,601 B1 * | 6/2003 | Brown et al. | 704/270.1 |
| 6,587,818 B2 | 7/2003 | Kanevsky et al. | |
| 6,651,043 B2 | 11/2003 | Ammicht et al. | |
| 6,725,199 B2 | 4/2004 | Brittan et al. | |
| 6,731,724 B2 | 5/2004 | Wesemann et al. | |
| RE38,649 E | 11/2004 | Setlur et al. | |
| 6,882,973 B1 | 4/2005 | Pickering | |

(Continued)

OTHER PUBLICATIONS

I. Bulyko, K. Kirchhoff, M. Ostendorf, J. Goldberg, Error-correction detection and response generation in a spoken dialogue system, Speech Communication, vol. 45, Issue 3, Mar. 2005, pp. 271-288.*

(Continued)

*Primary Examiner* — Edgar Guerra-Erazo

(57) ABSTRACT

A method, system and machine-readable medium are provided. Speech input is received at a speech recognition component and recognized output is produced. A common dialog cue from the received speech input or input from a second source is recognized. An action is performed corresponding to the recognized common dialog cue. The performed action includes sending a communication from the speech recognition component to the speech generation component while bypassing a dialog component.

20 Claims, 5 Drawing Sheets

(56) References Cited

U.S. PATENT DOCUMENTS

| | | |
|---|---|---|
| 6,965,863 B1 | 11/2005 | Zuberec et al. |
| 7,069,221 B2 | 6/2006 | Crane et al. |
| 7,552,055 B2 | 6/2009 | Lecoeuche |
| 7,624,016 B2 | 11/2009 | Ju et al. |
| 7,720,684 B2 * | 5/2010 | Huerta et al. ............ 704/257 |
| 8,065,148 B2 * | 11/2011 | Huerta et al. ............ 704/257 |
| 2002/0184031 A1 | 12/2002 | Brittan et al. |
| 2003/0088411 A1 | 5/2003 | Ma et al. |
| 2003/0125958 A1 | 7/2003 | Alpdemir et al. |
| 2003/0158732 A1 | 8/2003 | Pi et al. |
| 2003/0187657 A1 | 10/2003 | Erhart et al. |
| 2004/0083107 A1 | 4/2004 | Noda et al. |
| 2005/0027527 A1 * | 2/2005 | Junkawitsch et al. ...... 704/243 |
| 2005/0246173 A1 | 11/2005 | Creamer et al. |
| 2006/0247913 A1 * | 11/2006 | Huerta et al. ............... 704/1 |
| 2006/0247931 A1 | 11/2006 | Caskey et al. |

OTHER PUBLICATIONS

Heins, R., Franzke, M., Durian, M., and Bayya, A. (1997). Turntaking as a design principle for barge-in in spoken language systems. International Journal of Speech Technology, 2:155-164.*

Nicole Beringer, Daniela Oppermann, and Silke Steininger. Possible Lexical Indicators for Barge-In/Barge-Before in a Multimodal Man-Machine-Communication. SmartKom Technical Report 9, Ludwig-Maximilians-Universit at (LMU), Munich, Germany, 2001.

Heins et al., "Turn-taking as a design principle for barge-in in Spoken Language Systems", International Journal of Speech Technology, vol. 2, No. 2, pp. 155-164.

Rose, R.C. and Hong Kook Kim (2003): "A hybrid barge-in procedure for more reliable turn-taking in human-machine dialog systems". In Automatic Speech Recognition and Understanding, 2003, A SRU '03, 2003 IEEE, pp. 198-203.

* cited by examiner

SYSTEM AND METHOD FOR ISOLATING AND PROCESSING COMMON DIALOG CUES

PRIORITY INFORMATION

The present application is a continuation of U.S. patent application Ser. No. 11/246,604, filed Oct. 7, 2005. The contents of which is incorporated herein by reference.

BACKGROUND OF THE INVENTION

1. Field of the Invention

The present invention relates generally to speech recognition technology and in particular to isolating and processing common dialog cues without affecting a dialog application for which speech input is intended.

2. Introduction

In conventional speech dialog systems, an automatic speech recognizer (ASR) module may receive speech input from a user and may perform speech recognition of the speech input. The recognized speech may then be passed as text to a dialog application. The dialog application may analyze the input received from the ASR module to determine an action to take based on the input. If the action involves generating speech for outputting to the user such as, for example, prompts for additional user input, the dialog application may generate text and may pass the text to a text-to-speech (TTS) module, which may generate speech from the text for a user to hear.

When a new dialog application is designed, various conditions, such as, for example, error conditions, as well as other conditions, must be considered. Thus, the dialog application must be designed and implemented such that it can recover from the error conditions as well as properly handle the other conditions. Currently, design and implementation of dialog applications, which may perform complex error recovery processing as well as other processing, may be very complicated.

It would be desirable to be able to perform certain types of functions, such as recovery from error conditions, as well as other desirable functions, outside of the dialog application. By isolating the certain types of functions from the dialog application, dialog application design and implementation would become easier because the designers and implementers could focus their efforts on the application-specific functions without concern for the design or implementation of error recovery as well as the other desirable functions.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method of isolating and processing common dialog cues is provided. Speech input is received at a speech recognition component and recognized output is produced. A common dialog cue from the received speech input or input from a second source is recognized. An action is performed corresponding to the recognized common dialog cue. The performing of the action includes sending a communication from the speech recognition component to the speech generation component while bypassing a dialog component.

In a second aspect of the invention, a system is provided. The system includes a speech recognition component configured to receive speech input and produce a recognition output, and a text-to-speech component. The speech recognition component is further configured to recognize a common dialog cue included within the speech input or within input from a second source, and perform an action corresponding to the recognized common dialog cue, the action including bypassing a speech dialog application to communicate with the text-to-speech component.

In a third aspect of the invention, a machine-readable medium having instructions for at least one processor recorded thereon is provided. The machine-readable medium includes instructions for receiving speech input at a speech recognition component and producing a recognized output, instructions for recognizing a common dialog cue from the received speech input or input from a second source, and instructions for performing an action corresponding to the recognized common dialog cue. The instructions for performing the action further include instructions for sending a communication from the speech recognition component to the speech generation component while bypassing a dialog application.

In a fourth aspect of the invention, a system is provided. The system includes means for receiving speech input at a speech recognition component and producing a recognized output, means for recognizing a common dialog cue from the received speech input or input from a second source, and means for performing an action corresponding to the recognized common dialog cue. The means for performing an action corresponding to the recognized common dialog cue further includes means for sending a communication from the speech recognition component to the speech generation component while bypassing a dialog application.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Exemplary Spoken Dialog System

Figure 1:
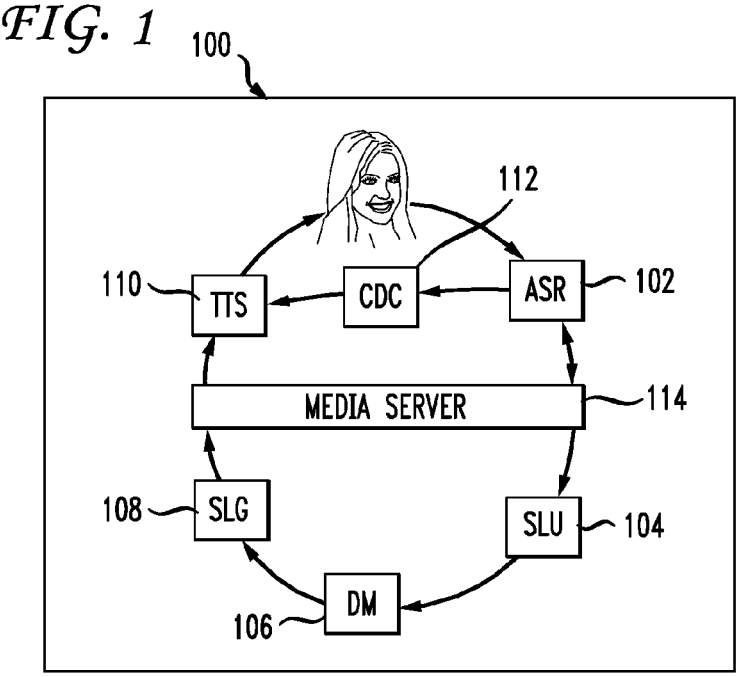
FIG. 1 illustrates an exemplary spoken dialog system consistent with principles of the invention.

FIG. 1 is a functional block diagram of an exemplary spoken dialog system 100 consistent with the principles of the invention. Spoken dialog system 100 may include an automatic speech recognition (ASR) module 102, a spoken language understanding (SLU) module 104, a dialog management (DM) module 106, a spoken language generation (SLG) module 108, a text-to-speech (TTS) module 110, a common dialog cue (CDC) module 112 and a media server 114.

Media server 114 may receive incoming speech input and may route the speech input such as, for example, incoming phone calls, to ASR module 102. Media server 114 may include a voice XML interpreter and may receive output from ASR module 102 and may forward ASR module 102 output to SLU module 104. Media server 114 may also receive SLG module 108 output and may forward SLG module 108 output to TTS module 110. SLG module 108 output may be in a form of voice XML ASR module 102 may analyze the speech input and may provide a transcription of the speech input as output. SLU module 104, DM module 106 and SLG module 108 may be included in a dialog application. Typically SLU module 104 of the dialog application may receive the transcribed input from ASR module 102 via media server 114 and may use a natural language understanding model to analyze the group of words that are included in the transcribed input to derive a meaning from the input. DM module 106 of the dialog application may receive an indication of the meaning of the input speech as input and may determine an action, such as, for example, providing a spoken response, based on the input. SLG module 108 may generate a transcription of one or more words in response to the action provided by DM 106. TTS module 110 may receive the transcription as input from SLG module 108 via media server 114 and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, generate audible "speech" from system 100, which the user then hears. In this manner, the user can carry on a spoken dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having an audio processing capability, for example a PDA with audio and a WiFi network interface) may have an ASR module wherein a user may say "call mom" and the smartphone may act on the instruction without a "spoken dialog interaction".

In exemplary spoken dialog system 100, ASR module 102 may be closely tied to TTS module 110 via CDC module 112 such that ASR module 102 may send commands to TTS module 110 via CDC module 112 and may receive indications from TTS module 110 via CDC module 112, as will become clear from a description of exemplary operation of system 100 appearing below in the specification. One advantage of having a closely tied ASR module 102 and TTS module 110 is that various conditions detected by ASR module 102 may be corrected without having to design the dialog application to detection and correct the various conditions. Further, prompting as well as other commands sent to the user by TTS module 110 from ASR module 102 may be performed with much less delay. Thus, recovery from certain conditions may occur much more quickly with less confusion to the user.

Figure 2:
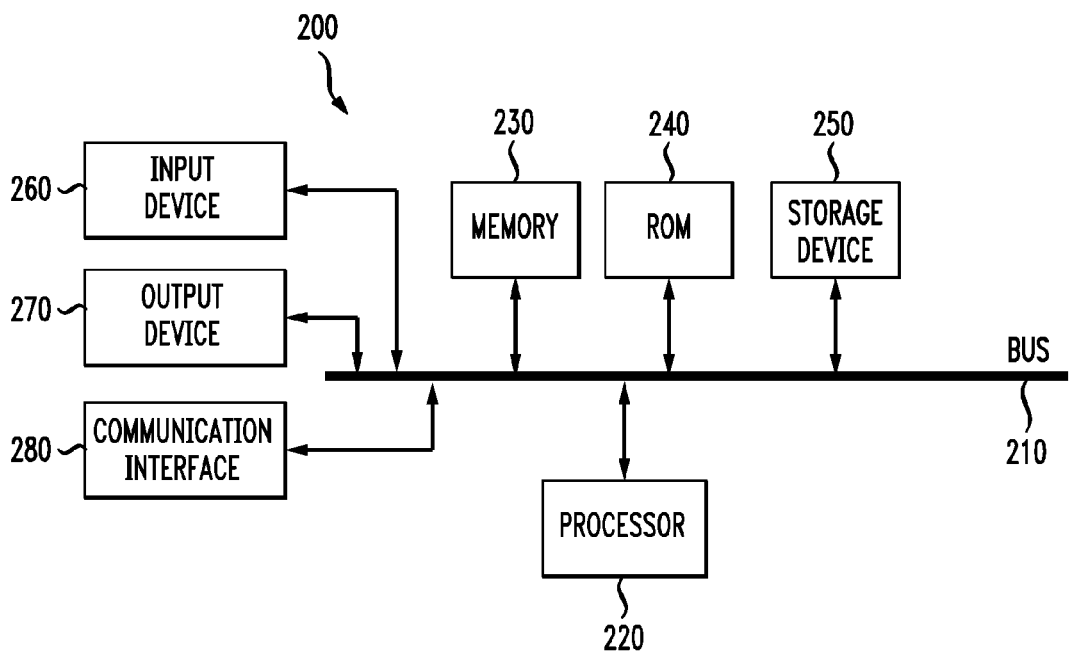
FIG. 2 illustrates an exemplary system that may be used to implement one or more components of the system of FIG. 1.

FIG. 2 illustrates an exemplary processing system 200 in which one or more of the components of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, a microphone, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of spoken dialog system 100, communication interface 280 may not be included in processing system 200 when spoken dialog system 100 is implemented completely within a single processing system 200.

System 200 may perform functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Exemplary Implementations

Figure 3:
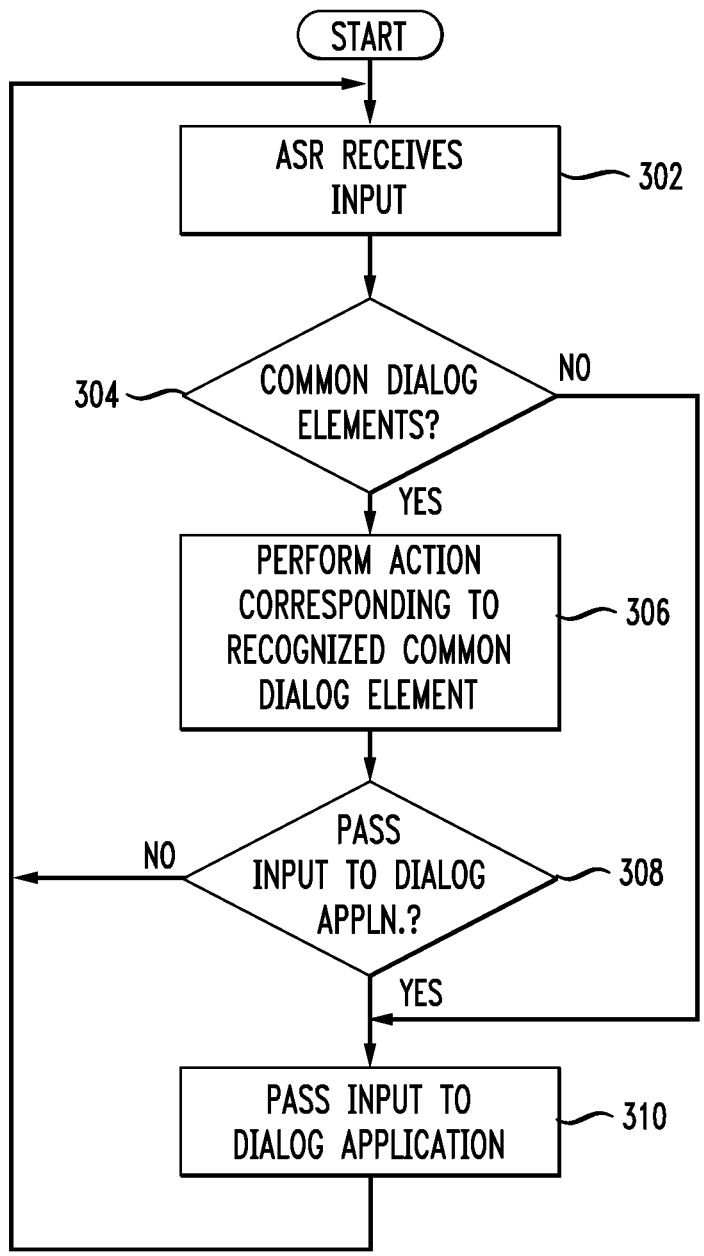
FIG. 3 is a high level flowchart that illustrates exemplary processing in implementations consistent with the principles of the invention.

FIG. 3 is a high level flowchart that illustrates an exemplary overview of a process that may be performed in implementations consistent with the principles of the invention. The process may begin with media server 114 forwarding received speech input to ASR module 102 (act 302). The speech input may be received via a microphone, via a landline or wireless telephone call, or via a number of methods. ASR module 102 may examine the received speech input to determine whether any common dialog cues are included in the input. In implementations consistent with the principles of the invention, the common dialog cues may include, for example, predetermined keywords, noise, or a change in predetermined properties of the speech input. In some implementations consistent with the principles of the invention, at least some of the input may come from another source, such as a telephone pad of a telephone, a computer keyboard or another device.

Next, ASR module 102 may determine whether the speech input, or alternatively, a second input, includes any common dialog cues (act 304). If no common cues are found, then ASR module 102 may pass the received speech input, via media server 114, to the dialog application (act 310), which in one implementation may include SLU module 104, DM module 106 and SLG module 108. If one or more common dialog cues are found, then ASR module 102 may forward indications of the common dialog cues to CDC module 112 and may perform one or more actions corresponding the recognized dialog cues (act 306). Examples of common cues and actions will be provided with reference to FIGS. 4 and 5, below.

Next, ASR module 102, may determine whether the speech input is to be passed to the dialog application (act 308). This determination is based on the particular action or actions that are to be performed. If ASR module 102 determines that it is to pass the speech input to the dialog application, then the speech input may be passed to the dialog application via media sever 114 (act 310).

ASR module 102 may then perform acts 302 through 310 repeatedly.

Figure 4:
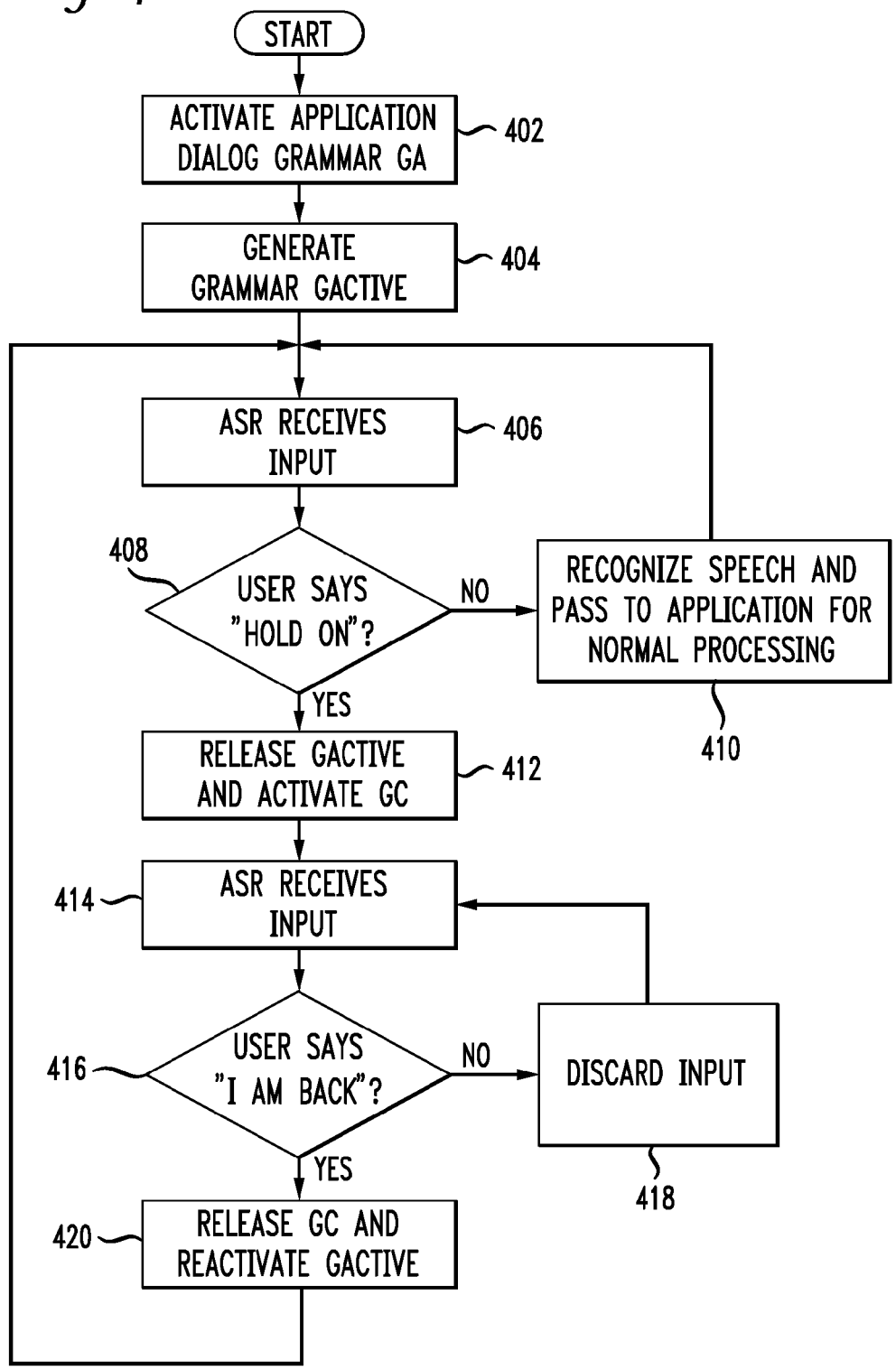
FIGS. 4-6 are flowcharts that illustrate exemplary processing in different implementations consistent with the principles of the invention.

FIG. 4 is a more detailed flowchart of an exemplary ASR process consistent with the implementation described with respect to FIG. 3. The process may begin with activation of a dialog grammar GA (act 402). ASR module 102 may generate grammar GActive, which may be a union of grammar GA and grammar GC (a grammar of common dialog cues) (act 404). This would provide ASR module 102 with the ability to recognize speech for the dialog application as well as common dialog cues in the speech input. ASR module 102 may then receive speech input and perform speech recognition using the GActive grammar (act 406).

In this exemplary process, the common dialog cues in the speech input may include the phrases "hold on" and "I am back." At this point, ASR module 102 may determine whether the speech input includes the phrase, "hold on" (act 408). If ASR module 102 determines that the phrase is not included in the speech input, then the recognized speech may be passed to the dialog application via media server 114 for normal processing (act 410) and ASR module 102 may receive additional speech input (act 406).

If ASR module 102 determines that the speech input includes the phrase "hold on" then ASR module 102 may release the GActive grammar and may activate the GC grammar (act 412). Using the GC grammar would typically be less resource intensive than using the GActive grammar Next. ASR module 102 may receive speech input (act 414). ASR module 102 may then determine whether the speech input includes "I am back" (act 416). If ASR module 102 determines that the speech input does not include "I am back" then the speech input may be discarded (act 418) and ASR module is ready to receive additional speech input (act 414).

If ASR module 102 determines that the speech input includes "I am back" then ASR module 102 may release grammar GC and may re-activate grammar GActive (act 420). ASR module 102 may again perform acts 406-420.

Thus, the exemplary processing described above and in FIG. 4 is for an implementation which provides a user an opportunity to temporarily stop sending input to the dialog application. This feature may be useful when the user must look up requested information, such as a credit card number. In such a situation, the user would simply say "hold on," look up the credit card number, say "I am back", and then say the credit card number.

In some implementations, after recognizing "hold on" in the speech input, ASR module 102 may send a pause command to TTS module 110, via CDC module 112, informing TTS module 110 to pause, stop prompting the user, and stop running a timeout timer, if any. The timeout timer may time a duration of a time interval from when a prompt is output by TTS module 110 to when ASR module 102 receives a speech input from the user. After ASR module 102 recognizes "I am back" in the speech input, ASR module 102 may send a second command to TTS module 110, via media server 114, to inform TTS module 110 to cause any stopped timeout timer to continue running or restart. Optionally, TTS module 110 may send an acknowledgement back to ASR module 102, via media server 114, to acknowledge receipt of a command sent to TTS module 110 from ASR module 102.

One problem that may occur in spoken dialog systems is called false barge-in. False barge-in may occur when a user speaks in a noisy environment or when the user coughs or makes some other unintentional sound. In such a situation, a conventional spoken dialog system may assume that the noise or other unintentional sound is part of the input and may attempt to perform speech recognition on the noise. The speech recognizer may inform other components of the speech dialog system that an error occurred during the input and the system may attempt to prompt the user to repeat the input. However, due to several layers of software that may reside between the speech recognition function and the speech generation or text-to-speech function that produces a prompt for the user, a delay may occur between the detection of an input error and the prompting for the user to repeat the spoken input. This delay may cause the input and prompting functions to become out of step with one another, thereby causing confusion and frustration for the user.

Figure 5:
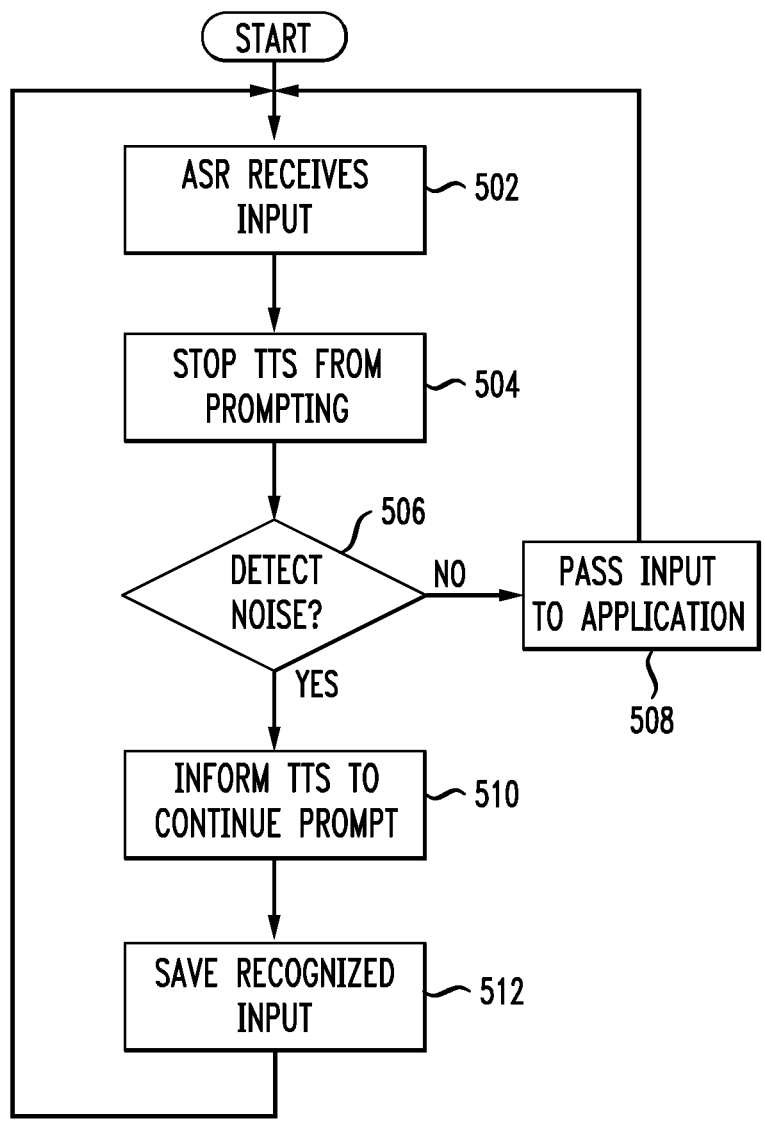

FIG. 5 is a flowchart that illustrates an exemplary process in an implementation consistent with the principles of the invention that addresses the false barge-in problem. The process may start with ASR module 102 receiving speech input from a user via media server 114 (act 502). ASR module 102 may then stop TTS module 110 from outputting a prompt (act 504). In one implementation, this may be achieved by ASR module 102 sending a "stop prompt" indication to TTS module 110 via CDC module 112 while bypassing the dialog application. Next, ASR module may determine whether any noise is detected on the speech input (act 506). ASR module 102 in this embodiment is capable of detecting unintended noises, such as coughs or other noises. There are a number of ways in which this could be achieved including detecting a change in spectral density, language used, or other audio input characteristics. If ASR module 102 does not detect noise, then ASR module 102 may pass the recognized speech to a dialog application via media server 114 (act 508).

If ASR module 102 detects noise or another problem that makes the input speech somewhat unintelligible, then ASR module 102 may discard the noise or problem input and may send a "continue prompt" indication to TTS module 110 via CDC module 112, bypassing the dialog application, to inform TTS module 110 to continue outputting the current prompt to the user (act 510). Thus, in a case in which noise is detected, the noise is discarded and the prompt continued, the user may hear a very brief interruption of a prompt.

In some implementations consistent with the principles of the invention, when a change in audio input characteristics suggests that the user or someone else was talking, but not talking to the dialog application, ASR module 102 may send an indication to TTS module 110 via CDC module, while bypassing the dialog application, to cause the TTS module 110 to output speech to the user, such as, for example, "Are you talking to me?"

In some implementations TTS module 110 may send an acknowledgment to ASR module 102 via CDC module 112 informing ASR module 102 of receipt of the message by TTS module 110.

In the exemplary implementation discussed with reference to FIG. 5, noise may be treated as a common dialog cue with the corresponding action being a re-prompting of the user. Further, due to the tight coupling of ASR module 102 and TTS module 110 for handling common dialog cues, when ASR module 102 informs TTS module 110 to stop prompting or to continue prompting, TTS module 110 may perform the requested action with very little delay, thus eliminating a source of confusion and frustration to the user.

In another implementation consistent with the principles of the invention, when only a portion of a speech input is recognizable, a targeted re-prompt may be performed. For example, if a user speaks a portion of an account number, such as, for example, 908 and then coughs or shuffles paper, he may be re-prompted with, for example, "I heard 908, please continue."

Figure 6:
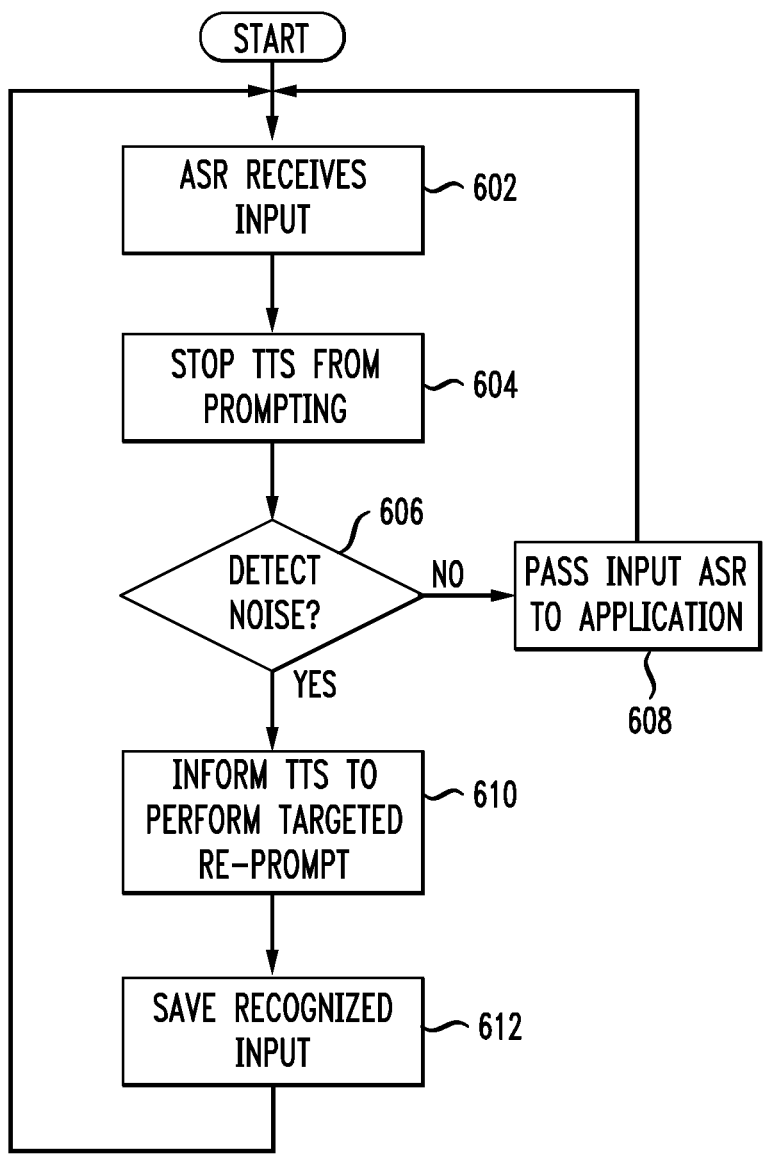

FIG. 6 is a flowchart that illustrates exemplary processing in an implementation that includes targeted re-prompt. The process may begin with ASR module 102 receiving speech input via media server 114 (act 602). ASR module 102 may then send a "stop prompt" message to TTS module 110 via CDC module 112, bypassing the dialog application (act 604). ASR module 102 may then determine whether noise was received (act 610). This may be performed using any of the methods previously described. If ASR module 102 does not detect noise, then ASR module 102 may pass the recognized speech input, in the form of text, to the dialog application via media server 114 (act 608). If ASR module 102 detects noise (act 606), then ASR module 102 may pass a message to TTS module 110 via CDC module 112, bypassing the dialog application, to inform TTS module 110 to perform a targeted re-prompt (if a portion of the speech input was recognized) (act 610). TTS module 110 may then inform the user of what was recognized and may ask the user to continue providing input. ASR module 102 may save the input (act 612) and may repeat acts 602-612. The saved recognized input and the recognized continued input may later be passed to the dialog application.

CONCLUSION

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. Accordingly, the appended claims and their legal equivalents should only define the invention, rather than any specific examples given.

We claim as our invention:

1. A method comprising:
    receiving a first speech input from a user interacting with a dialog system at a speech recognition component;
    upon recognizing a first cue from the first speech input:
        instructing a speech generation component to pause speech generation;
        receiving a second speech input from the user; and
        while speech generation is paused, developing a potential dialog via a dialog application based on the second speech input; and
    upon recognizing a second cue from the second speech input:
        instructing the speech generation component to resume the speech generation;
        discarding the potential dialog;
        recognizing a third speech input using the speech recognition component, to yield data associated with recognized speech from the third speech input; and
        outputting the data associated with the recognized speech.

2. The method of claim 1, wherein the speech recognition component uses a first grammar, the method further comprising:
utilizing a second grammar distinct from the first grammar to recognize the second speech input.

3. The method of claim 2, wherein the second grammar is configured for improved speech recognition of the second cue.

4. The method of claim 1, wherein the first cue and the second cue each comprise one of a predefined word and a predefined phrase.

5. The method of claim 1, wherein pausing speech generation also pauses dialog management.

6. The method of claim 1, further comprising:
when the first speech input is only partially recognizable, providing a targeted re-prompt.

7. The method of claim 1, wherein the first cue comprises one of a cough, a sneeze, and a shuffle of paper.

8. A system comprising:
a processor; and
a computer-readable storage medium having instructions stored thereon which, when executed on the processor, cause the processor to perform operations comprising:
receiving a first speech input from a user interacting with a dialog system at a speech recognition component;
upon recognizing a first cue from the first speech input:
instructing a speech generation component to pause speech generation;
receiving a second speech input from the user; and
while speech generation is paused, developing a potential dialog via a dialog application based on the second speech input; and
upon recognizing a second cue from the second speech input:
instructing the speech generation component to resume the speech generation;
discarding the potential dialog;
recognizing a third speech input using the speech recognition component, to yield data associated with recognized speech from the third speech input; and
outputting the data associated with the recognized speech.

9. The system of claim 8, wherein the speech recognition component uses a first grammar, and wherein the computer-readable storage medium has additional instructions stored which result in the operations further comprising:
utilizing a second grammar distinct from the first grammar to recognize the second speech input.

10. The system of claim 9, wherein the second grammar is configured for improved speech recognition of the second cue.

11. The system of claim 8, wherein the first cue and the second cue each comprise one of a predefined word and a predefined phrase.

12. The system of claim 8, wherein pausing speech generation also pauses dialog management.

13. The system of claim 8, wherein the computer-readable storage medium has additional instructions stored which result in the operations further comprising:
when the first speech input is only partially recognizable, providing a targeted re-prompt.

14. The system of claim 8, wherein the first cue comprises one of a cough, a sneeze, and a shuffle of paper.

15. A computer-readable storage device having instructions stored which, when executed by a computing device, cause the computing device to perform operations comprising:
receiving a first speech input from a user interacting with a dialog system at a speech recognition component;
upon recognizing a first cue from the first speech input:
instructing a speech generation component to pause speech generation;
receiving a second speech input from the user; and
while speech generation is paused, developing a potential dialog via a dialog application based on the second speech input; and
upon recognizing a second cue from the second speech input:
instructing the speech generation component to resume the speech generation;
discarding the potential dialog;
recognizing a third speech input using the speech recognition component, to yield data associated with recognized speech from the third speech input; and
outputting the data associated with the recognized speech.

16. The computer-readable storage device of claim 15, wherein the speech recognition component uses a first grammar, and wherein the computer-readable storage medium has additional instructions stored which result in the operations further comprising:
utilizing a second grammar distinct from the first grammar to recognize the second speech input.

17. The computer-readable storage device of claim 16, wherein the second grammar is configured for improved speech recognition of the second cue.

18. The computer-readable storage device of claim 15, wherein the first cue and the second cue each comprise one of a predefined word and a predefined phrase.

19. The computer-readable storage device of claim 15, wherein pausing speech generation also pauses dialog management.

20. The computer-readable storage device of claim 15, the computer-readable storage device having additional instructions stored which result in the operations further comprising:
when the first speech input is only partially recognizable, providing a targeted re-prompt.

* * * * *